United States Patent [19]

Niioka et al.

[11] 3,711,657

[45] Jan. 16, 1973

[54] CONTROL DEVICE FOR A TAPE RECORDER FOR DETECTING THE BEGINNING OF A DESIRED PROGRAM

[75] Inventors: Takeharu Niioka; Noriji Itoh, both of Yokohama; Hideyasu Ishigo, Kawasaki, all of Japan

[73] Assignee: Tokyo Shibaura Electric Co., Ltd., Kawasaki-shi, Japan

[22] Filed: May 5, 1971

[21] Appl. No.: 140,322

[30] Foreign Application Priority Data

May 8, 1970 Japan ..............................45/38678

[52] U.S. Cl...................179/100.2 S, 179/100.1 VC, 179/100.2 MD 226/24, 226/43, 307/254

[51] Int. Cl.......................G11b 15/18, G11b 27/22

[58] Field of Search.......179/100.2 S, 100.2 R, 100.2 MD,179/100.1 VC; 242/55.19; 226/24, 33, 43; 307/254

[56] References Cited

UNITED STATES PATENTS 3,596,005 7/1971 Hamilton.......................179/100.2 S
3,405,461 10/1968 Joslow...........................179/100.2 S
3,334,194 8/1967 Chang............................179/100.2 S
3,298,006 1/1967 Milenkovic et al.............179/100.2 S
3,583,617 6/1971 Kosaka..........................179/100.2 S
3,623,039 11/1971 Barham.........................179/100.2 S

*Primary Examiner*—Bernard Konick
*Assistant Examiner*—Alfred H. Eddleman
*Attorney*—Flynn & Frishauf

[57] ABSTRACT

A control device for a tape recorder comprising means for detecting no-signal portions of a magnetic recording tape disposed between adjacent program portions, and means for either stopping the fast forward or rewind of the tape upon receipt of signals showing said detection or for continuing said fast forward or rewind as desired even when there is detected the aforesaid no-signal portion, thereby controlling a fast forward or rewind mechanism by effecting said stoppage of continuation through the actuation of an electromagnetic plunger according to whether a pair of transistors of the control device are turned on or off.

6 Claims, 5 Drawing Figures

CONTROL DEVICE FOR A TAPE RECORDER FOR DETECTING THE BEGINNING OF A DESIRED PROGRAM

BACKGROUND OF THE INVENTION

This invention relates to a control device for a tape recorder particularly of a cartridge or cassette type and more specifically to a control device capable of permitting the free passage of an undesired program at fast forward or rewind speed and of quickly detecting the beginning of a desired program to be produced.

Heretofore, where there was to be reproduced a desired music program from its beginning by selecting it from among those recorded in the same channel of a magnetic tape received, for example, in a cartridge, a control button for fast forward or rewind was pushed, and when the tape traveled for certain length it was temporarily stopped by a stop button. Thereafter a reproduction button was tentatively pushed to identify from the reproduced sounds the kind of program which was further going to be reproduced. This cycle of operation was repeated until there was found the beginning of a desired music program, thus consuming a great deal of time.

Among recently developed tape recorders is the type wherein, when a given program has been reproduced in part, it is subjected to fast forward by pushing a fast forward button, unless it is desired to reproduce said program any further, and a no-signal portion immediately following said program is detected to stop the fast forward and the tape is made ready for reproduction of the succeeding program.

Even the aforementioned type of tape recorder has the following difficulties. For illustration, let us take a case where there are recorded programs A, B and C on a tape in the order mentioned and the user is supposed to know that recording was made in said order.

It sometimes happens that when the reproduction of the program A has been brought to an end, it is desired to reproduce the program C by skipping over the program B. In this case, however, the above-mentioned tape recorder unavoidably detects the no-signal portion intervening between the programs A and B to stop the fast forward of the tape, resulting in the reproduction of the undesired program B. Since the fast forward speed is slowed down to the reproduction speed during the passage of the no-signal portion intervening between the programs A and B, the user has to wait for a certain length of time before the desired program C can be reproduced. With a commercially available cassette or cartridge type tape containing popular music tunes, a no-signal portion included in a 3-minute program generally requires 3 seconds for its passage at reproduction speed, if it is short and ten seconds, if it is long. Accordingly, the aforementioned operation with such tape will be bothersome.

It is accordingly the object of this invention to provide a control device for a tape recorder capable of automatically detecting the beginning of a desired program during the fast forward or rewind of the tape recorder and quickly reproducing said program from its beginning.

SUMMARY OF THE INVENTION

According to this invention, when there is detected a no-signal portion of a magnetic recording tape intervening between adjacent programs in carrying out its fast forward or rewind, a transistor circuit actuates a plunger connected thereto upon detection of said no-signal portion to release either the fast forward or rewind. The control device of the invention further includes means capable of reproducing a desired program from its beginning with one or more unnecessary programs skipped over by fast forward or rewind. Said means includes a mono-stable multivibrator having a sufficient reset time to cover the length of at least the aforesaid no-signal portion of the magnetic tape as measured by a factor of time required for the passage of said portion through a magnetic head. Said mono-stable multivibrator is actuated when the fast forward button is pushed or when the magnetic head is returned from the no-signal portion to the program portion for rewind of the tape. Output from the multivibrator is supplied to the transistor circuit so as to cause the no-signal portion of the tape to pass through the magnetic head at fast forward or rewind speed.

DETAILED DESCRIPTION OF THE INVENTION

Figure 1:
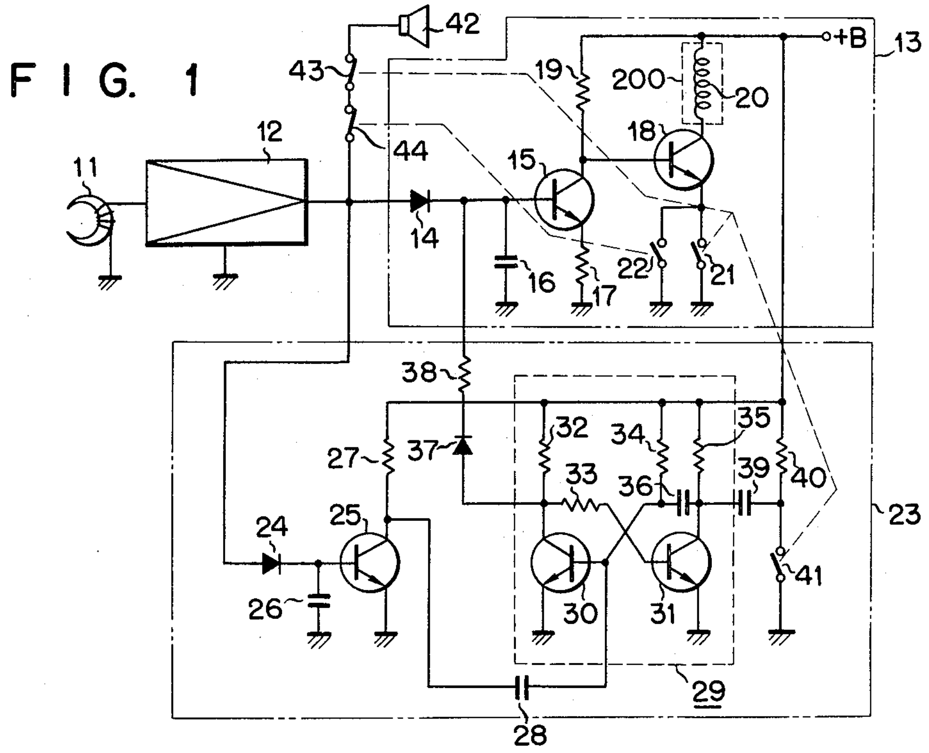
FIG. 1 is a circuit diagram of a tape recorder control device according to an embodiment of this invention.

Referring to FIG. 1, one of the output terminals of a reproduction magnetic head 11 is grounded and the other output terminal is connected to the input terminal of an amplifier 12. The output from the amplifier 12 is supplied to the anode of a diode 14 included in a first control section 13. The cathode of said diode 14 is connected to the base electrode of a first transistor 15 and also grounded through a capacitor 16. The emitter electrode of the first transistor 15 is grounded through a resistor 17, and the collector electrode thereof is connected to the base electrode of a second transistor 18 and also to a +B source terminal through a resistor 19. Between the collector of the second transistor 18 and +B source terminal is connected to the magnetic coil 20 of a plunger 200. As later described, said plunger 200 is designed, when deenergized, to carry out the fast forward or rewind, and, when energized, to release the fast forward or rewind and perform a reproduction operation. The emitter of the transistor 18 is grounded through the parallel connected fast forward switch 21 and rewind switch 22.

In a second control section 23, the anode electrode of a diode 24 is connected to the output terminal of the amplifier 12 and the cathode electrode thereof is connected to the base electrode of a third transistor 25 and also grounded through a capacitor 26. The emitter of the transistor 25 is grounded and its collector is connected to the +B source terminal through a resistor 27 and connected to the base electrode of one transistor 30 of a monostable multivibrator 29 through a capacitor 28. Since the multivibrator a known type, description of its circuit is omitted. Reference numerals 30 and 31 represent transistors, 32 to 35 resistors and 36 a capacitor all associated with said multivibrator 29. The collector of the transistor 30 is connected to the base electrode of the first transistor 15 through a series circuit comprised of a diode 37 and resistor 38. The collector of the transistor 31 is connected to one end of a capacitor 39, the other end of which is connected to the +B source through a resistor 40, and also grounded through a switch 41 for reversing the action of the multivibrator 29 interlocking with the fast forward switch 21. The output from the amplifier 12 is supplied to a loud-speaker 42. At the time of fast forward or rewind, however, there are operated switches 43 and 44 interlocking with the aforesaid fast forward switch 21 and rewind switch 22 respectively so as to prevent the loud-speaker 42 from being actuated.

There will now be described the interlocking relationship of the plunger 200 of FIG. 5 and the associated circuits and drive mechanism, though they are not particularly important for the purpose of this invention. Fast forward, rewind and reproduction circuits 211, 221 and 101, respectively, are turned on when the buttons 210, 220 and 100, respectively, are manually pushed in the direction of the arrow (a) so as to be electrically set for fast forward, rewind and reproduction respectively. Namely, when the switches schematically shown in the blocks of the circuits 211, 221 and 101 are closed, these circuits are rendered operable. The opening and closing of the fast forward switch 21 and rewind switch 22 of FIG. 1 correspond to those of the schematically indicated switches of the circuits 211 and 221. The three circuits 211, 221 and 101 are of known type and include means for controlling the rotating direction and speed of the associated motor. Once the buttons 210, 220, and 100 are pushed in the direction of the arrow (a) by the user's hand, they are so designed as to be locked at the pushed positions by separate means (not shown) even when the hand is removed. There is provided a drive mechanism of known type which is set for fast forward, rewind and reproduction in interlocking relationship with the buttons 210, 220 and 100. For practical application, the control device of the prior art includes a common stop button and a record button and circuits associated therewith. For briefness, description of their arrangement is omitted. After being pushed, the fast forward, rewind and reproduction buttons 210, 220 and 100 are released by the aforesaid common stop button (not shown). Upon said release, the circuit 211, 221 and 101 and associated drive mechanism are rendered inoperative. In the control device of this invention, the lock of the buttons 210 and 220 after they are pushed is released by the plunger 200 also. Namely, when the exciting coil 20 is energized, the plunger 200 is urged in the direction of the arrow (b) (FIG. 5) to cause the pushed buttons 210 and 220 to be released in the same direction and the drive mechanism 300 to be unlocked. When the user continues forcefully to push the buttons by hand as is often the case with the conventional tape recorder, then the circuits 211 and 221 and associated drive mechanism 300 are kept in operation. However, such continuous push of the buttons is troublesome and impractical. It is fundamentally preferred, therefore, that fast forward and rewind be effected by the one-touch operation of these buttons. Particularly, a tape recorder mounted on an automobile for the driver's use should be worked by the one-touch operation of the buttons.

Figure 2:
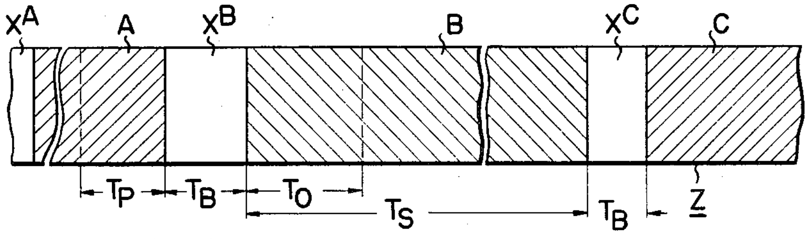
FIG. 2 illustrates the design of a magnetic tape used in a tape recorder equipped with the control device of the invention.

There will now be described a tape recorder control device according to an embodiment of this invention. While any of the programs A, B and C (indicated in hatching in FIG. 2) recorded in a magnetic tape of the design shown in said figure is being the reproduced, output from the magnetic head or reproduction head 11 is supplied to the loud-speaker 42 through the amplifier 12. Now let it be assumed that for reproduction of the program B, it is desired to subject the program A to fast forward though its reproduction is not finished. Then the fast forward button 210 is pushed to cause fast forward to be started by the fast forward device included in the drive mechanism 300, the fast forward switch 21 (one of those represented by the switch schematically illustrated in the circuit block 211) to be closed, and in consequence the circuit of the loud-speaker 42 to be opened by the switch 43. At this time the switch 41 is closed, the actions of this switch 41 and the multivibrator 29 are later detailed. Under such condition, there is generated the signal of a program with the tape subjected to fast forward, though the program is not reproduced through a loud-speaker. However, said signal is rectified by the diode 14 and capacitor 16 through the amplifier 12 and supplied to the base electrode of the first transistor 15 as a forward bias voltage to turn it on and reduce the base electrode of the second transistor 18 to nearly zero so as to turn it off, because the resistor 17 has an extremely small value. As a result, said transistor 18 is rendered non-conducting and the plunger 200 is not energized due to absence of current in the exciting coil 20, thereby keeping the magnetic tape in a fast forward condition. Namely, where the signal-impressed portion of the program recorded in a tape is still positioned at the magnetic head 11 after the fast forward button 210 is pushed by one-touch, the fast forward of the tape is automatically continued while the signal of this program is obtained from the magnetic head 11. Consequently said output from the magnetic head 11 may be deemed as a control signal for continuation of the fact forward. It will be understood that the ON and OFF conditions of the transistors 15 and 18 are the same as at the time of reproduction.

When the fast forward advances to a certain extent, the no-signal portion of the magnetic tape is brought to the magnetic head 11, reducing the output therefrom to zero. As a result, the transistor 15 is turned off, and the base voltage of the second transistor 18 is increased substantially up to the same level as that of the +B source to turn on the second transistor 18. Accordingly, current flows through the plunger coil 30, second transistor 18 and fast forward switch 21 to actuate the plunger 200, which in turn releases the lock of the fast forward mechanism as shown in FIG. 5 to stop it and opens the fast forward switch 21. Since, even at this time, the reproduction mechanism still remains locked, the magnetic tape is made to travel at reproduction speed to reproduce the desired program B from its beginning.

There will now be described another case when the program B is to be subjected to fast forward so as to be skipped over upon completion of the reproduction of the program A and the program C is reproduced from its beginning. Now let it be assumed that the user, of course, knows that there were recorded all these programs in the order mentioned. This is the case where it is not desired to reproduce the program B after reproduction of the program A, but to reproduce the program C. When the no-signal portion following the program A is brought to the magnetic head 11 and the user pushes the fast forward button 210, then fast forward is started to cause the switches 21 and 41 to be closed and the switch 43 to be opened. Since there is not generated any output from the magnetic head 11, there is not obtained any output to turn on the transistor 15. Originally, therefore, the transistor 18 would be turned on and the plunger 200 would be actuated in an attempt to release fast forward as shown in FIG. 5. With the control device of this invention, however, the switch 41 is closed in advance and in consequence the mono-stable multivibrator 29 reverses the conditions of the transistors 30 and 31 from ON to OFF and from OFF to ON respectively. This reversed condition continues for the length of time defined by the RC time constant of the resistor 34 and capacitor 36. Accordingly, the voltage of the +B source is impressed on the base electrode of the transistor 15 as a forward bias voltage through the diode 37 and resistor 38 to turn on the transistor 15 and turn off the transistor 18. As described above, therefore, the plunger 200 ceases to be operated so as to permit the continuation of fast forward. Namely, even when the no-signal portion $X_B$ between the programs A and B is brought to the magnetic head 11, fast forward can be effected by the action of the monostable multivibrator 29, eliminating the necessity of waiting longer than a few seconds as is the case with the prior art tape recorder. With the conventional device, however, when the no-signal portion of the tape arrives at the magnetic head 11, the fast forward button is unlocked, unless it is continuously pushed force-fully by hand thus causing the tape to be preferentially brought to a reproduction state. In some cases, the no-sound interval sometimes lasts even as long as about 10 seconds, and the prior art button must be held down this long. According to this invention, however, the multivibrator 29 is reversed again after lapse of a certain length of time defined by the prescribed RC time constant of the resistor 34 and capacitor 36 to the original stable condition, that is, the transistor 30 is brought back to the ON state and the transistor 31 to the OFF state. At this point, however, the aforesaid no-signal portion $X_B$ between the programs A and B already passes the magnetic head 11, causing fast forward to be continued by the signal of the program B through the above-described series of operational steps.

When the no-signal portion $X_C$ following the program B is brought to the magnetic head 11, the amplifier 12 does not produce any signal to turn off the transistor 15, turn on the transistor 18 and energize the plunger coil 20, with the resulting release of fast forward. Accordingly, the tape is brought again to the reproduction state, permitting the desired program C to be reproduced from its beginning, that is, the music of said program to be generated by the loud-speaker 42.

The reversion time or reset time of the monostable multivibrator 29 is originally determined at the time of design in view of the pattern of a tape to be used. Since, however, said determination should be made in consideration of the rewind time of the tape, details will be given later.

There will now be described the operation of rewinding the tape. With respect to rewind, there may be considered two cases. (1) where, after completion of reproduction of a given program, the succeeding program is momentarily reproduced for a prescribed time length $T_O$ and then the original program is reproduced again from its beginning; and (2) where, after there is momentarily reproduced a given program for more than a prescribed time length $T_O$ and said program is reproduced again from its beginning. The case (1) represents the case where the user hears, for example, part of the program B after listening to the full program A, and further desires said program A to be reproduced again from its beginning. For example, where, after completion of reproduction of the program A, there is pushed the rewind button 220 when the program B is reproduced for a time length of less than $T_O$, then the rewind switch 22 is closed and the switch 44 is opened, initiating rewind by means of the rewind circuit 221 and the associated device included in the drive mechanism 300. Said rewind is stopped when the magnetic head 11 passes at rewind speed by the action of the monostable multivibrator 29 through that portion of the program B corresponding to said time length of less than $T_O$ and then the no-signal portion $X_B$ between the programs A and B and reaches the no-signal portion $X_A$ preceding the program A, thereby causing the program A to be reproduced a second time. There will now be detailed the aforementioned operation by reference to the condition of the control device of this invention before the rewind button 220 is pushed. When the magnetic head 11 is shifted from the no-signal portion $X_B$ of the tape to the beginning of the program B after completion of reproduction of the program A, the transistor 25 is turned on and the resultant changed voltage is impressed on the base of the transistor 30 through the capacitor 28 to reverse the action of the monostable multivibrator 29, causing the transistor 15 to be biased in the forward direction during the reset time of the multivibrator 29 and the transistor 18 to be turned off. As a result, the plunger 200 does not work, but permits continuation of rewind. The reset time of the multivibrator 29 is sufficiently long for the no-signal portion $X_B$ between the programs A and B to pass through the magnetic head 11 at rewind speed. When rewind advances to the program A through said no-signal portion $X_B$, the magnetic head 11 gives forth the signal of the program A. While said signal is produced from the magnetic head 11, the transistor 18 remains unactuated. Accordingly, the plunger 200 is not operated, but permits rewind to be still continued. The multivibrator 29 is already reset by the time when the magnetic head 11 is brought to the no-signal portion $X_A$ preceding the program A. While said no-signal portion $X_A$ passes through the magnetic head 11, there is not produced any signal. As a result, the transistor 18 is turned on to actuate the plunger 200 and unlock the rewind button 220, so that the reproduction button 100 pushed in advance is preferentially put into operation to restart reproduction of the program A. There will now be described the case (2) where, after hearing the whole of the program A and part of the program B, the user desires the program B to be reproduced again from its beginning. There will now be described the rewind operation to be used in this case, when the rewind button 220 is pushed after the program B is reproduced for a time length $T_O$, rewind is commenced. Since the monostable multivibrator 29 is already reset before the no-signal portion $X_B$ passes through the magnetic head 11, said rewind is stopped while the no-signal portion $X_B$ is passing through the magnetic head 11, again bringing the tape to a reproduction state to cause the program B to be reproduced from its beginning.

Since the forgoing description is suppose to help the reader fully to understand the fundamental function of the control device of this invention, there is further detailed the range of the reset time of the monostable multivibrator. With a cartridge type tape containing many popular music tunes, the sufficient reset time, T of the monostable multivibrator 29 to permit fast forward in particular is generally preferred to fall within a range defined by the following formula (1):

$$T_B/n < T < (T_S + T_B/n) \qquad (1)$$

where:

$T_B$ = average time length (sec.) of no-signal portion at reproduction speed $T_S$ = average time length (sec.) of a program portion at reproduction speed $n$ = multiples by which the fast forward or rewind speed is accelerated over that of reproduction The reset time $T$ of the multivibrator 29 defined mainly in consideration of rewind may be expressed by the following formula (2):

$$T_O + (T_B + T_O/n) \leqq T < T_S + 2T_B/n \qquad (2)$$

The left term $T_O + (T_B + T_O/n)$ represents the time to meet the conditions of rewind, namely, a sum of the time length of the initial portion of a program based on reproduction speed and the rewind time $T_O + T_B$. For practical purposes, the reset time of the monostable multivibrator 29 is so chosen as to be substantially equal to said left term $T_O + (T_B + T_O/n)$. This also satisfies the condition of the formula (1). According to the embodiment of FIG. 1, $T_O$ is set at about 5 seconds. Where the rewind botton 220 is pushed within 5 second after reproduction of, for example, the program B in part, rewind is continued while the no-signal portion $X_B$ passes through the magnetic head 11. The reset time of the multivibrator 29 should not exceed that time represented by the right term $(T_S + 2T_B/n)$, which is required for the fast forward or rewind of a program portion as well as of the no-signal portions immediately before and after said program portion. Generally the program portion is reproduced in about 3 minutes, and fast forward or rewind is carried out in a time equal to one-tenth to one-twentieth of that which is required for reproduction. Namely, the fast forward or rewind of a program portion alone is effected in about 9 to 18 seconds.

In practice, however, the time length of a no-signal portion at reproduction speed is indefinite, varying from about 3 to about 10 seconds, so that it is difficult definitely to define the reset time of the monostable multivibrator. Since, however, n represents a considerably large multiple, said reset time may be chosen to have a proper value. The aforesaid time length actually presents some variations due to the arbitrary selection of the reset time, but the magnitude of said variations is less than $(T_B \max - T_B \min/n + 1)$. In practice, the rewind speed is taken to be 10 to 20 times faster than the reproduction speed, that is, the no-signal portion is supposed to pass through the magnetic head 11 during rewind in an extremely short time as about 0.35 to 0.7 seconds, so that the aforementioned variations in the time length $T_O$ at reproduction speed do not present any important problem.

Figure 3:
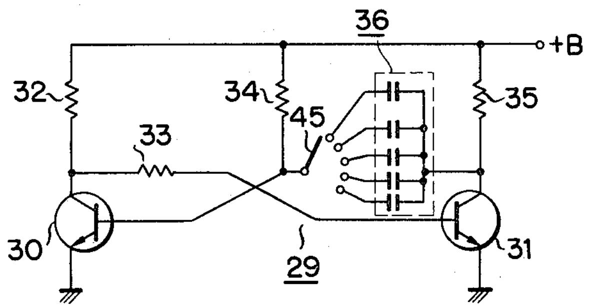
FIG. 3 represents a modification of the CR circuit of the multivibrator of FIG. 1.

With the control device according to the embodiment of FIG. 1, the conditions for searching for a desired program recorded in a magnetic tape at fast forward or rewind speed and reproducing it later are provisionally defined. If, however, there is used a monostable multivibrator 29 arranged as shown in FIG. 3, its reset time $T$ can be arbitrarily defined, offering great advantages in practical application. Namely, the multivibrator of FIG. 3 is formed by providing a plurality of parallel arranged capacitors 36 for the CR circuit for defining the reset time so as to be selectively used by a switch 45. Such arbitrary determination of the reset time enables fast forward or rewind to be started at any desired point of a magnetic tape. Where, after part of the program A is reproduced, its remainder and the whole of the program B are subjected to fast forward so as to reproduce the program C from its beginning, the reset time $T$ of the monostable multivibrator 29 is only required to be set at a value expressed by the following formula:

$(T_P + T_B/n) \leqq T < (T_S + 2T_B/n)$ by selective use of the capacitors 36.

where:

$T_P$ = time length from that point of the program A at which reproduction was stopped to the end of said program.

Where there is to be reproduced a desired program, for example, D, E or F from the beginning by skipping over some preceding tunes, it is only required to use a proper reset time by selective actuation of the capacitors 36.

There will now be described by reference to FIG. 4 a control device according to another embodiment of this invention. The same parts of FIG. 4 as those of FIG. 1 are denoted by the same numerals, and description of the speaker circuit is omitted. That part of the circuit which extends up to the base electrode of a first transistor 46 is the same as in FIG. 1. However, the collector electrode thereof is connected to the base electrode of a second transistor 47 and the emitter electrode of the first transistor 46 is directly grounded. The emitter electrode of the second transistor 47 is connected to the +B source and the collector electrode thereof is connected to one end of the plunger coil 20 through the normally open contact of a switch 48 interlocking with the plunger 200. The other end of the plunger coil 20 is grounded. Between the emitter of the second transistor 47 and said one end of the plunger coil 20 are connected parallel arranged fast forward and rewind switches 21 and 22. The base electrode of the transistor 31 of the monostable multivibrator 29 is connected to the +B source through a capacitor 49, diode 50 of the indicated polarity, trigger switch 41 interlocking with the fact forward switch 21 and parallel connected switches 21 and 22, all these being connected in series. The output circuit of the monostable multivibrator 29 and that of the transistor 25 are the same as in FIG. 1 and description thereof is omitted. With this arrangement, the plunger 200 is designed, when energized, to permit the continuation of fast forward or rewind and, when deenergized, to release said operation.

Figure 4:
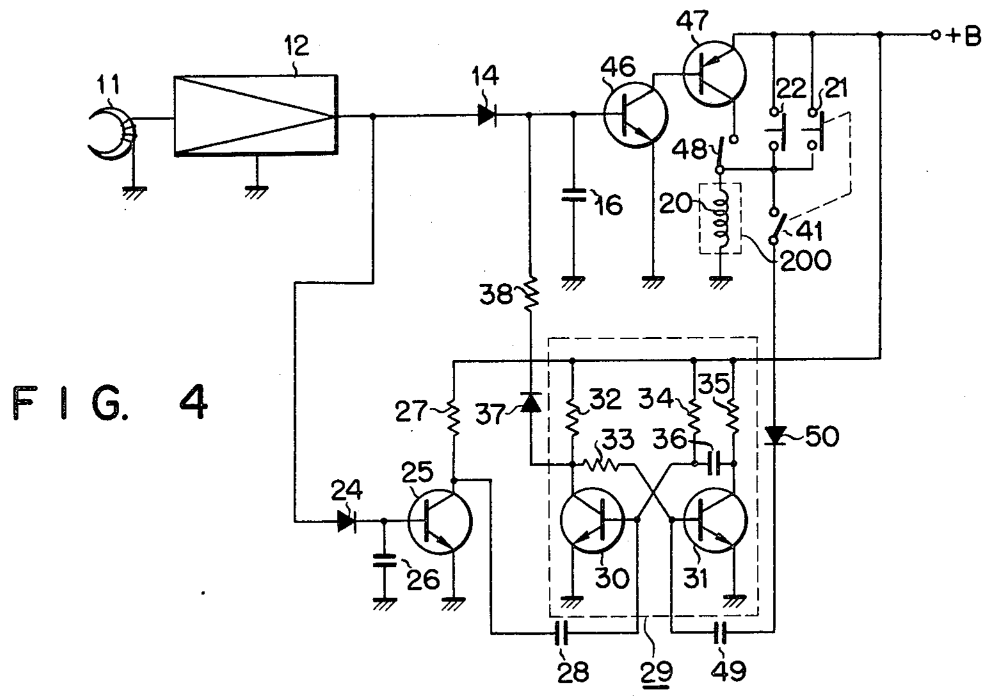
FIG. 4 is a circuit diagram of a tape recorder control device according to another embodiment of the invention.
Figure 5:
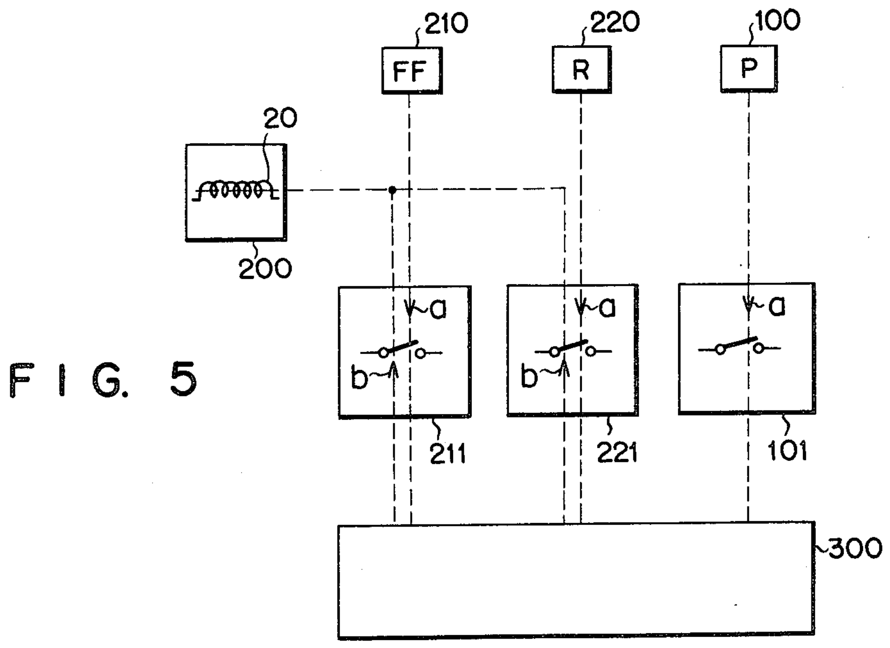
FIG. 5 indicates a schematic arrangement of switches associated with the control device of the invention.

When the fast forward button 210 of FIG. 5 is pushed, the switches 21 and 41 of FIG. 4 are closed and the monostable multivibrator 29 is reversed in action to excite the plunger coil 20. The resultant actuation of the plunger 200 closes the switch 48. At this time the transistor 46 is turned on by being biased in the forward direction by the output from the monostable multivibrator 29, whether the amplifier 12 generates any signal or not. The actuation of the transistor 46 also turns on the transistor 47, causing the plunger to hole itself. As described in the embodiment of FIG. 1, with the reset time of the monostable multivibrator 29 defined in advance, fast forward is released when the prescribed no-signal portion passes through the magnetic head 11 and another no-signal portion is detected, thereby commencing reproduction of a desired program.

There will now be described the case where there is pushed the rewind button 220. At this time the plunger coil 20 is energized and the normally open switch 48 is closed to hold itself. When rewind is carried out before the time length $T_0$ at reproduction speed is brought to an end, the transistors 46 and 47 remain actuated by the output from the monostable multivibrator 29, even when the no-signal portion is brought to the magnetic head 11, thus allowing said portion to travel at rewind speed through the magnetic head 11. Where rewind is performed after the aforesaid time length $T_0$ elapses, then the monostable multivibrator is reset before the no-signal portion is brought to the magnetic head 11, thereby releasing rewind when said no-signal portion arrives at the magnetic head 11.

In the embodiment of FIG. 4, as in FIG. 1, proper selection of the reset time of the monostable multivibrator enables a desired program to be quickly reproduced from its beginning.

As mentioned above, this invention is capable of reproducing a desired program from its beginning by simple fast forward or rewind operations and, if required, more than one program may be skipped over by arbitrarily defining the reset time of a monostable multivibrator.

What is claimed is:

1. A control device for a tape recorder having a program signal reproduction section, comprising:

first and second control sections;

said first control section including:

a semiconductor circuit coupled to the program signal reproduction section of said tape recorder, said semiconductor circuit being operative or non-operative responsive to both (a) the presence or absence of reproduced program signals and (b) output signals from the second control section; and releasing means coupled to said semiconductor circuit for releasing the fast forward or rewind modes of said tape recorder according to the condition of the semiconductor circuit; and said second control section including a monostable multivibrator actuated both (a) upon receipt of reproduced program signals and (b) in response to the tape recorder being put in a fast forward mode so as to operate said semiconductor circuit for a prescribed period of time to allow said tape recorder to pass over predetermined program signals in either the fast forward or rewind mode of said tape recorder.

2. The control device according to claim 1 wherein said semiconductor circuit comprises a circuit for rectifying reproduced program signals; a first transistor whose base, collector and emitted electrodes are connected to a rectifier circuit, +B source and a ground terminal respectively; a second transistor whose base electrode is connected to the collector electrode of the first transistor; and parallel connected fast forward and rewind switches disposed between the emitter electrode and the ground terminal of the second transistor; and wherein the releasing means is an electromagnetic plunger means connected between the collector electrode of the second transistor and the +B source, the energization of said electromagnetic plunger means releasing fast forward or rewind.

3. The control device according to claim 1 wherein the releasing means is an electromagnetic plunger means provided with a normally open switch, and plunger means being connected between the other end of the normally open switch and ground and, when deenergized, releasing fast forward or rewind; and wherein the semiconductor circuit comprises a circuit for rectifying reproduced program signals; a first transistor whose base and emitter electrodes are connected to the rectifier circuit and the ground terminal respectively; a second transistor whose base, emitter and collector electrode are connected to the collector of the first transistor, +B source and one end of the normally open switch of the releasing means respectively; and parallel connected fast forward and rewind switches disposed between the +B source and the other end of the normally open switch.

4. The control device according to claim 1 wherein the second control section further includes an auxiliary semiconductor circuit which causes the monostable multivibrator to be reversed in action when supplied with reproduced program signals in order to control the rewind.

5. The control device according to claim 1 wherein the monostable multivibrator is reversed in action upon the closing of a trigger switch interlocking with the fast forward switch, and actuates the semiconductor circuit for a prescribed reset time of said multivibrator thereby enabling a particular portion of the tape on which no program material is recorded to pass by the magnetic head of said tape recorder at fast forward speed.

6. The control device according to claim 1 wherein the monostable multivibrator comprises a plurality of parallel arranged capacitors for the RC time constant circuit thereof which defines the reset time of said multivibrator, and a switch for selectively coupling said capacitors into the time constant circuit to selectively vary the reset time of said multivibrator, thereby enabling said tape recorder to pass over a predetermined number of program materials on said tape.

* * * * *